(12) United States Patent
Martin et al.

(10) Patent No.: US 11,623,311 B2
(45) Date of Patent: Apr. 11, 2023

(54) EXTRACTION SYSTEM AND APPARATUS AND METHOD THEREOF

(71) Applicant: GEOGRAPHE ENTERPRISES PTY LTD, Kewdale (AU)

(72) Inventors: Sean Hayden Martin, Parkwood (AU); Jamaleddin Barikbin, Melville (AU); Nicholas James Pyper, Carine (AU)

(73) Assignee: GEOGRAPHE ENTERPRISES PTY LTD, Kewdale (AU)

( * ) Notice: Subject to any disclaimer, the term of this patent is extended or adjusted under 35 U.S.C. 154(b) by 307 days.

(21) Appl. No.: 16/611,640

(22) PCT Filed: May 8, 2018

(86) PCT No.: PCT/AU2018/050422
§ 371 (c)(1),
(2) Date: Nov. 7, 2019

(87) PCT Pub. No.: WO2018/204972
PCT Pub. Date: Nov. 15, 2018

(65) Prior Publication Data
US 2020/0061761 A1 Feb. 27, 2020

(30) Foreign Application Priority Data

May 9, 2017 (AU) .............................. 2017901721
Sep. 26, 2017 (AU) .............................. 2017903907

(51) Int. Cl.
*B23P 19/00* (2006.01)
*B23P 19/027* (2006.01)
(Continued)

(52) U.S. Cl.
CPC ........... *B23P 19/027* (2013.01); *B23P 19/025* (2013.01); *B23P 19/04* (2013.01);
(Continued)

(58) Field of Classification Search
CPC ...... B25B 27/064; B25B 27/026; B25B 27/02
See application file for complete search history.

(56) References Cited

U.S. PATENT DOCUMENTS 3,711,925 A 1/1973 Mazer
5,836,078 A * 11/1998 Aiken .................. B25B 27/064
29/898.07
(Continued)

FOREIGN PATENT DOCUMENTS

CN 204686784 U 10/2015
DE 202004018212 U1 2/2005
EP 2241405 A1 10/2010

OTHER PUBLICATIONS

International Search Report and Written Opinion dated Jul. 12, 2018 from International Application No. PCT/AU2018/050422 (Authorised officer, Conor O'Brien), 11 pages.

*Primary Examiner* — Lee D Wilson
(74) *Attorney, Agent, or Firm* — MH2 Technology Law Group, LLP

(57) ABSTRACT

In accordance with embodiments of the invention there is provided an extraction system, and extraction apparatus (30) and method therefore in for removing studs from sockets. The system is particularly advantageous for removing one or more studs (28) from the sockets (24) of bell cranks (16) of steering systems of vehicles such as an Off-highway Truck. In a particular arrangement the apparatus (30) comprises a frame member (32) adapted to be attached to a pivot joint (14) for extraction of the stud (28) from the socket (16). Furthermore, the apparatus 30 comprises actuator means (34) adapted to be selectively displaced between an extended condition and a contracted condition for applying a force to the stud (28) so as extract or at least loosen the stud (28) from the socket (36). In a particular arrangement, the (Continued)

actuator (34) comprises a hydraulic actuator. The system is adapted to remotely operate the extraction apparatus (30).

32 Claims, 17 Drawing Sheets

(51) Int. Cl.
    *B23P 19/02*     (2006.01)
    *B25B 27/02*     (2006.01)
    *B23P 19/04*     (2006.01)
    *B25B 27/00*     (2006.01)
    *B25B 28/00*     (2006.01)
    *B25B 27/14*     (2006.01)

(52) U.S. Cl.
    CPC ........ *B25B 27/0035* (2013.01); *B25B 27/026* (2013.01); *B25B 28/00* (2013.01); *B25B 27/00* (2013.01); *B25B 27/14* (2013.01)

(56) References Cited

U.S. PATENT DOCUMENTS

| | | | | |
|---|---|---|---|---|
| 6,266,861 B1* | 7/2001 | Chen | ..................... | B25B 27/064 |
| | | | | 29/261 |
| 6,665,918 B1* | 12/2003 | Williams | .............. | B25B 27/023 |
| | | | | 29/259 |
| 9,737,981 B2* | 8/2017 | Rowe | ..................... | B25B 27/062 |
| 10,393,184 B2* | 8/2019 | Wallman | .............. | B25B 27/064 |
| 2010/0095499 A1* | 4/2010 | Hung | ................... | B25B 27/064 |
| | | | | 29/252 |
| 2015/0224635 A1* | 8/2015 | Andrews | ............. | B25B 27/0035 |
| | | | | 29/251 |
| 2016/0023334 A1* | 1/2016 | Rowe | ..................... | F16D 3/405 |
| | | | | 29/244 |
| 2020/0061761 A1* | 2/2020 | Martin | ................. | B23P 19/027 |

\* cited by examiner

EXTRACTION SYSTEM AND APPARATUS AND METHOD THEREOF

CROSS-REFERENCE TO RELATED APPLICATIONS

This application is a U.S. National Stage application of PCT/AU2018/050422 filed 8 May 2018, which claims priority to Australian Application No. 2017903907 filed 26 Sep. 2017, and Australian Application No. 2017901721 filed 9 May 2017, the entire disclosures of which are hereby incorporated by reference in their entireties.

TECHNICAL FIELD

The present invention relates to systems (and apparatus and methods thereof) for conducting maintenance and repair procedures for machinery and vehicle components.

The invention has been devised particularly, although not necessarily solely, in relation to systems and apparatus and methods thereof for disassembling parts of vehicle components such as studs from sockets, for example, ball studs from sockets of bell cranks of steering system of vehicles.

BACKGROUND ART

The following discussion of the background art is intended to facilitate an understanding of the present invention only. The discussion is not an acknowledgement or admission that any of the material referred to is or was part of the common general knowledge as at the priority date of the application.

Maintenance and repair of machinery or mechanical components of vehicles is typically a time consuming and cumbersome process. For example, the particular processes for disassembling machinery and equipment undertaken during maintenance and repair procedures can be time consuming processes; thus, the processes for disassembling machinery and equipment typically incorporate relative long delays in the maintenance and repair procedures.

In particular, disassembling particular machinery and vehicle components may require time because some of their parts may be difficult to separate from each other due to the fact that the parts may be strongly bonded together due to debris hardened between the junction of the parts, corrosion formed in the junction or deformation of the parts occurring during use of the machinery or the vehicle component.

Examples of vehicle components that require periodical revision (to ensure proper functioning to avoid any accidents) and perhaps disassembly for maintenance or repair purposes are steering systems. This is particularly true due to the relative large forces and impacts that are continuously applied to the steering systems during their use Referring to FIG. 1, broadly speaking, a steering system 10 for a vehicle typically comprises a multitude of rods 12. Each rod 12 has (1) an end pivotally attached via a pivot joint 14 to a bell crank 16; and (2) another end pivotally attached via a pivot joint 14 to a steering knuckle arm 18. Although not shown in FIG. 1, the bell crank 16 operatively connects to a pivot shaft and the steering is moved left and right by hydraulic cylinders. This arrangement allows transferring the rotational movement of the steering wheel to the wheels of the vehicles.

FIG. 2 shows a cross-section of one of the pivot joints 14.

As shown in FIG. 2, a particular pivot joint 14 comprises a ball joint having a pin 20 for pivotally attaching an eye 22 (also referred to as second socket 22) of one end of a particular rod 12 to one of the eyes 24 (also referred to as first socket 24) of the bell crank 16. The eye 22 acts as the housing containing for example bearings 23 to allow movement of the ball joint.

Further, as can be seen in FIG. 2, a relative narrow gap 15 is defined between the lower surface of the socket 22 and the upper surface of the socket 24.

The pin 20 comprises a ball 26 adapted to be inserted in the socket 22 of the end of a rod 12, and a stud 28 adapted to be inserted in the socket 24 of the bell crank 16 for defining of the pivot joint 14. The pivot joint 14 comprises a fastener 29 releasably attached to the end 31 of the stud 28 of the pin 20 for securing the pivot joint 14 together. Further, the socket 22 may comprise a cap 25 for concealing the ball 26 and the bearing 23 within the socket 22. The cap 25 reduces entry of contamination and moisture into the socket 22.

Disassembly of the pivot joint 14 requires, for example, initially removing the socket 22 of the end of the rod 12 and subsequently, the stud 28 is removed from the socket 24 of the bell crank 16.

Typically, removal of the stud 28 from the socket 24 of the bell crank 16 is very difficult; this may be because of debris and/or corrosion that entered the socket 24 of the bell crank 16 impeding release of the stud 28 from the socket 24. Also, deformation of the shape of the socket 24 and its inner surfaces as well as deformation of the outer surfaces of the stud 28 may also impede or at least compromise release of the stud 28 from the socket 24 of the bell crank 16 when the pivot joint 14 needs to be disassembled for replacement thereof and/or repair of the steering system.

A traditional method for removing the stud 28 from the socket 24 of the bell crank 16 usually requires heat to be applied to the bell crank 16 so as to expand the opening (taper) defined by the socket 24 along with hammer strikes to the bell crank 16 in an effort to release the stud 28. For example, a steel wedge is placed between the bell crank and the underside of the steering control arm, it is then struck with a sledge hammer repeatedly until the taper bond is broken. This presents the risk of personal injury through burning, socket/soft tissue injury from shrapnel and trauma through pinch points and poorly aimed hammer strikes. Also, this can result in eye injury as well as damage to adjacent components due to poorly placed blows.

These traditional methods are labour intensive and more importantly they are dangerous due to involving impacting the sockets 24 with tools (such as hammers) and on occasions applying heat to the sockets 24 and the bell cranks 16; thus, these traditional methods involve great risks of injury or even death.

Developing new methods for removing studs 28 from sockets 24 of the bell crank 16 has encountered difficulties that has impeded the traditional studs removal processes to evolve so as to not represent a safety risk for the operators and not be as labor intensive as the traditional methods. These difficulties are, for example, the fact that the gap 15 defined between the socket 22 and socket 24 (see FIG. 2) is very narrow making it difficult (in particular, in large off-Highway trucks) to apply relative large forces between the sockets 22 and sockets 24 for removal of the strut 28. Another difficulty is the very limited workspace (defining a relative small confined space) that exists adjacent the steering systems 10 of vehicles due to the presence of the steering components, wheels and chassis. These difficulties among others make it very difficult to improve the traditional stud removal processes and therefore currently no save and efficient stud removal process is being in use that would comply with current workplace health and safety regulations; thus, currently operators are forced to take great risks when removing of a stud 28 from a bell crank 16, while being located in the confined space comprising the steering components for applying heat and impacting with hammering tools the steering components.

The above is particularly true when trying to remove ball studs from Off-Highway trucks of the type used in high-production mining and heavy-duty environments. This is because, for example, of the relative large loads being applied to steering systems 10 of these particular vehicles and the heavily dust and particles polluted environments in which these vehicles operate. The large loads and polluted environment make the studs 28 to be trapped inside the socket 24 in welded-like conditions making removal of the studs 28 nearly impossible without the use of hammer blows or tray trop impacts and/or applying heat.

Further, applying impacts and heat for removal of the struts 28, requires that an operator be located adjacent the ball struts 28 within, as mentioned before, a relative small workspace space due the presence of the steering components, wheels and chassis. Working within confined small with a heat source and applying impacts to, for example, steering components is particularly unsafe due the high possibility of the operators getting burned by the heat sources and injured while applying the impacts to the steering components.

These factors make the stud removal process in vehicles, in particular Off-Highway trucks of the type used in high-production mining and heavy-duty environments, labor intensive unsafe and therefore do not comply with current workplace health and safety regulations.

It is against this background that the present invention has been developed.

SUMMARY OF INVENTION

According to a first aspect of the invention there is provided an apparatus for extracting a stud from a socket defined within a body; the apparatus comprising a frame member adapted to be attached to the body, and an actuator attached to the frame member, the actuator being adapted to apply force to the stud, wherein the frame member is configured to position the actuator at a particular location to apply the force to the stud for extraction of the stud from the socket.

Preferably, the frame member comprises a distal end adapted for attachment to the body, and a proximal end having a surface for receiving the actuator.

Preferably, the actuator comprises a hydraulic actuator.

Preferably, the actuator is adapted to be controlled and operated from a location located spaced apart from the apparatus for extracting a stud from a socket.

Preferably, the surface comprises an indentation for receiving the actuator.

Preferably, the frame member is configured so that the surface is located opposite to the distal end of the frame member to position the actuator opposite to the body for applying the force of the actuator to the stud for extraction thereof.

Preferably, the force is applied to an end of the stud.

Preferably, the frame member comprises a body having surface and arm members extending perpendicularly from the surface.

Preferably, the arm members comprise ends defining the distal end of the frame member.

Preferably, the ends of the arm members comprise fingers that extend perpendicularly from the ends towards each other.

Preferably, the body from which the stud needs to be removed, comprises a socket of a bell crank (or a buckle arm) of a steering system.

Preferably, the socket is part of a pivot joint for attaching a socket of a steering rod to the bell crank (or the buckle arm); both sockets defining a gap between them when joined together to define the pivot joint.

Preferably, the fingers comprises ends.

In one arrangement, the ends of the fingers of the arm members are adapted to be inserted into the gap defined between sockets of the steering rod and the bell crank (or the buckle arm).

Preferably, each end of a finger comprises a reduced thickness with respect to the thickness of the remaining portion of the respective finger.

In an alternative arrangement, the apparatus comprises a support member adapted to be attached to the socket of the bell crank and adapted to attach the frame member to the support member.

Preferably, the support member comprises a cavity for receiving a front portion of the socket of the bell crank.

Preferably, the support member comprises an upper surface and side walls extending from the upper surface defining a cavity.

Preferably, the support member comprises at least one flange extending from the side walls of the support member.

In a particular arrangement, the flange comprises openings for defining handles to facilitate carrying and installing the extraction apparatus to the pivot joint.

Preferably, the upper surface comprises an indentation for receiving a portion of the stud located between sockets of the steering rod and the bell crank when the support member is mounted on the front portion of the socket of the bell crank.

Preferably, the frame member is releasably attached to the support member.

Preferably, the fingers of the distal end of the frame member comprise curved fingers defining guides adapted to slideably receive the flanges of the support member for attachment of the frame member to the body.

Preferably, the actuator comprises a hydraulic cylinder comprising a piston adapted to be selectively displaced between a contracted condition and an extended condition for applying the force to the stud for release of the stud from the body.

Preferably, the capacity of the hydraulic cylinder to be used as actuator 34 depends on the particular use that will be given to the extraction apparatus.

In a particular arrangement, the extraction apparatus further comprises retaining means adapted to keep the frame member of the extraction apparatus attached to the pivot joint during operation of the extraction apparatus.

Preferably, the retaining means are adapted to impede expansion of the distal end of the frame member.

Preferably, the retaining means are adapted to impede the finger ends from being drawn out from the gap.

In one arrangement, the ends of the fingers of the arm members are adapted to be inserted into the gap defined between sockets of the steering rod and the bell crank (or the buckle arm).

Preferably, each end of a finger comprises a reduced thickness with respect to the thickness of the remaining portion of the respective finger.

Preferably, the retaining means comprises a retainer and a blade adapted to be attached to the retainer.

Preferably, the retainer comprises an U-shaped body adapted for receiving the distal end of the frame member, with the open end of the U-shaped body adapted to receive the blade for closing the open end of the U-shaped body.

Preferably, the retaining means comprise fastening means for fastening the blade to the retainer.

Preferably, the fastening means comprise spring loaded indent balls (or screws) and passages traversing ends of the retainer that are located at the open-end of the U-shaped retainer.

Preferably, the passages comprise an opening for receiving the spring loaded indent balls (or the screw) and extending into the end permitting the spring loaded indent balls (or the screw) to traverse the passage such that the ball rests on the ends of the blade.

Preferably, the curved fingers comprise at their curved portions, first and second indentations.

Preferably, the first indentation is adapted to receive the inner side of the closed end of the U-shaped body of the retainer and the second indentation is adapted to receive the inner side of the blade when the retaining means are installed to the frame member.

Preferably, the retainer and the blade comprises each a handle defined by an opening made each proximal end thereof.

According to a second aspect of the invention there is provided a stud extraction apparatus configured to remove a stud from a pivot joint defined by a first socket of a bell crank and a second socket of a steering rod, the first and second sockets being arranged to define a gap therebetween, the stud extractor comprising a frame member, and an actuator attached to the frame member, the actuator being adapted to apply force to the stud, wherein the frame member comprises a body having a surface for receiving the actuator and arm members extending from the surface defining a passage permitting the bell crank traversing the frame member; wherein the arm member comprise a distal end comprising fingers having ends to be inserted between the gap defined by the first and second sockets as the bell crank traverses the frame member for fastening of the stud extractor to the bell crank.

According to a third aspect of the invention there is provided a system for removing a stud from within a body, the system comprising at least one extraction apparatus in accordance with the first or second aspects of the invention and means for operating the extraction apparatus from a location spaced apart from the extraction apparatus.

Preferably, the means for operating the extraction apparatus from a location spaced apart from the extraction apparatus comprises a hydraulic system operatively connected to the extraction apparatus for permitting operation of the extraction apparatus.

Preferably, the hydraulic system comprises a hydraulic fluid reservoir fluidly connected to the extraction apparatus via a hydraulic hose and pump means for delivering the hydraulic fluid to the actuator of the extraction apparatus.

Preferably, the system further comprising a control system operatively connected to the hydraulic system and the extraction apparatus permitting control as well as monitoring of the stud removal process.

Preferably, the control system comprises monitoring means to permit monitoring of the extraction apparatus during the process stud removal process.

Preferably, the monitoring means comprise sensors and video cameras.

Preferably, the control system is adapted to interact with an interface to permit the operator to interact remotely with the system for operating the extraction apparatus.

Preferably, the interface comprises computer hardware devices (such as laptops, tablets, PCs) and/or mobile phones.

According to a second aspect of the invention there is provided a method for an operator to remove at least one stud from at least one socket defined within at least one body being located in a space including steering components having the stud and the socket, the method comprises the step of:

the operator accessing the space;

the operator mounting one or more extraction apparatus in accordance with the first or second aspects of the invention onto one or more pivot joints comprising the studs and sockets;

the operator exiting the space and proceeding to the remote location; and operating the extraction apparatus from the remote location operating the system as defined in the second aspect of the invention for removing the at least one stud from the at least one body.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENT(S)

Figure 3:
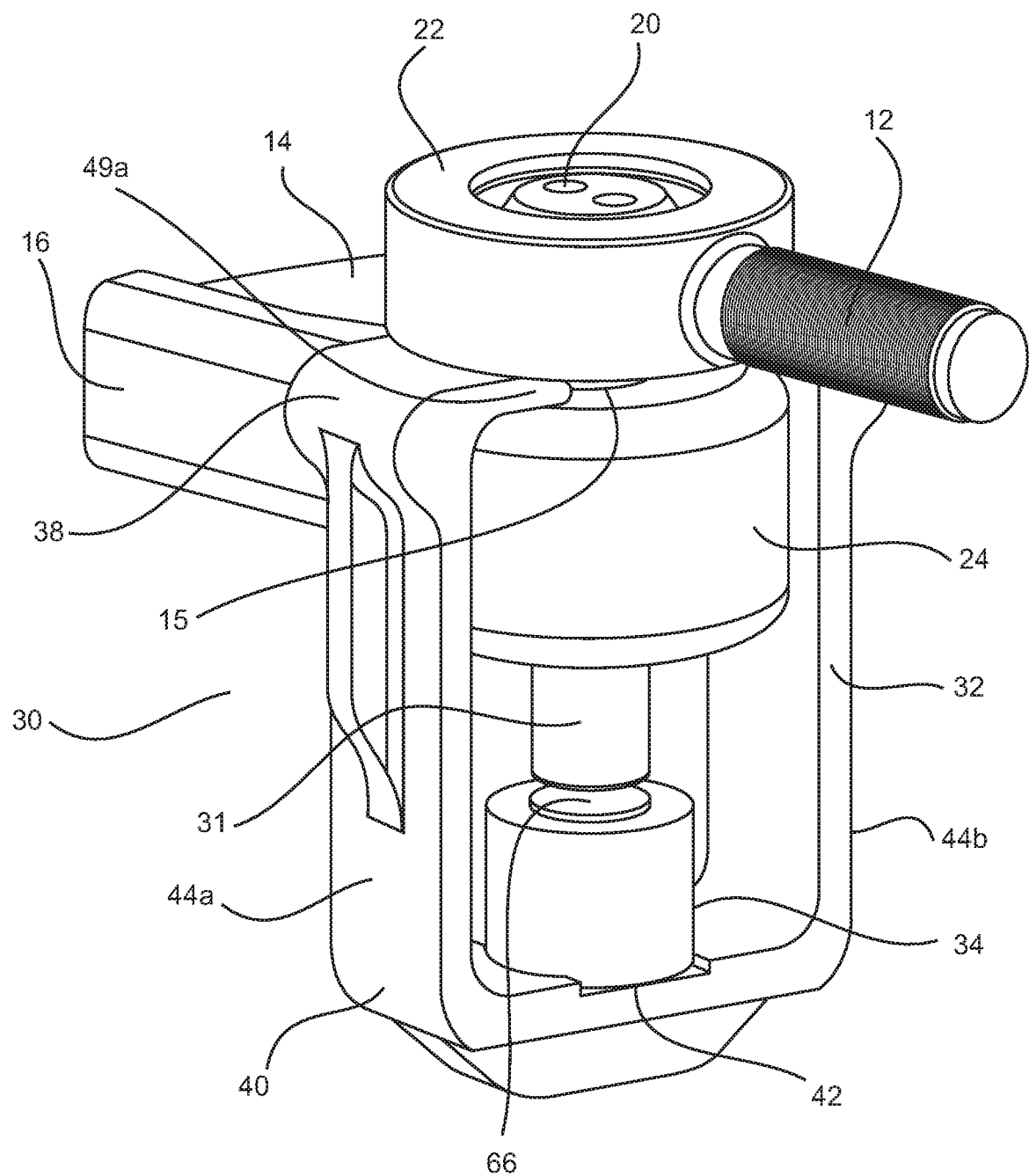
FIG. 3 is a perspective view of a particular arrangement of an extraction apparatus in accordance with a first embodiment of the invention operatively connected to the pivot joint shown in FIG. 2.
Figure 5:
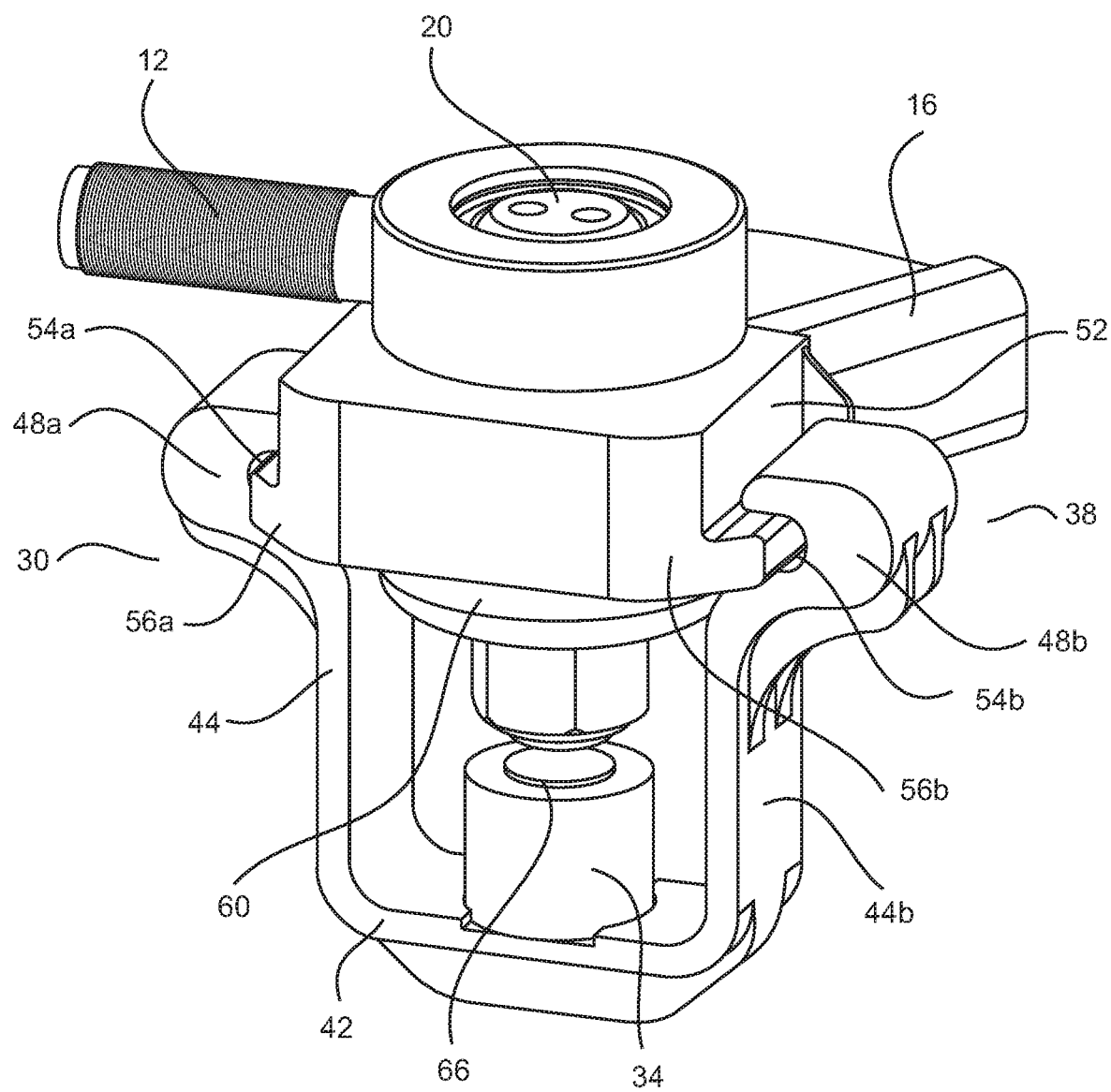
FIG. 5 is a perspective view of an extraction apparatus in accordance with a second embodiment of the invention operatively connected to the pivot joint shown in FIG. 2.

FIGS. 3 and 5 show, respectively, particular arrangements of an extraction apparatus 30 in accordance with the first and second embodiment of the invention.

The extraction apparatus 30 in accordance with the first and second embodiment of the invention comprises a frame member 32 adapted to be attached to a pivot joint 14 for extraction of the stud 28 from the socket 16.

Furthermore, the apparatus 30 comprises actuator means 34 adapted to be selectively displaced between an extended condition and a contracted condition for applying a force to the stud 28 so as extract or at least loosen the stud 28 from the socket 36. In a particular arrangement, the actuator 34 comprises a hydraulic actuator.

In the particular arrangement shown in the figures, the actuator 34 comprises a hydraulic cylinder comprising a piston 66 adapted to be selectively displaced between a contracted condition and an extended condition. The capacity of the hydraulic cylinder to be used as actuator 34 depends on the particular use that will be given to the extraction apparatus; for example, hydraulic systems able to apply forces of about 30 tonnes to 50 tonnes (or of greater or lesser tonnage) may be used for separating pivot joints 14 of steering systems 10 of heavy duty vehicles.

Figure 4:
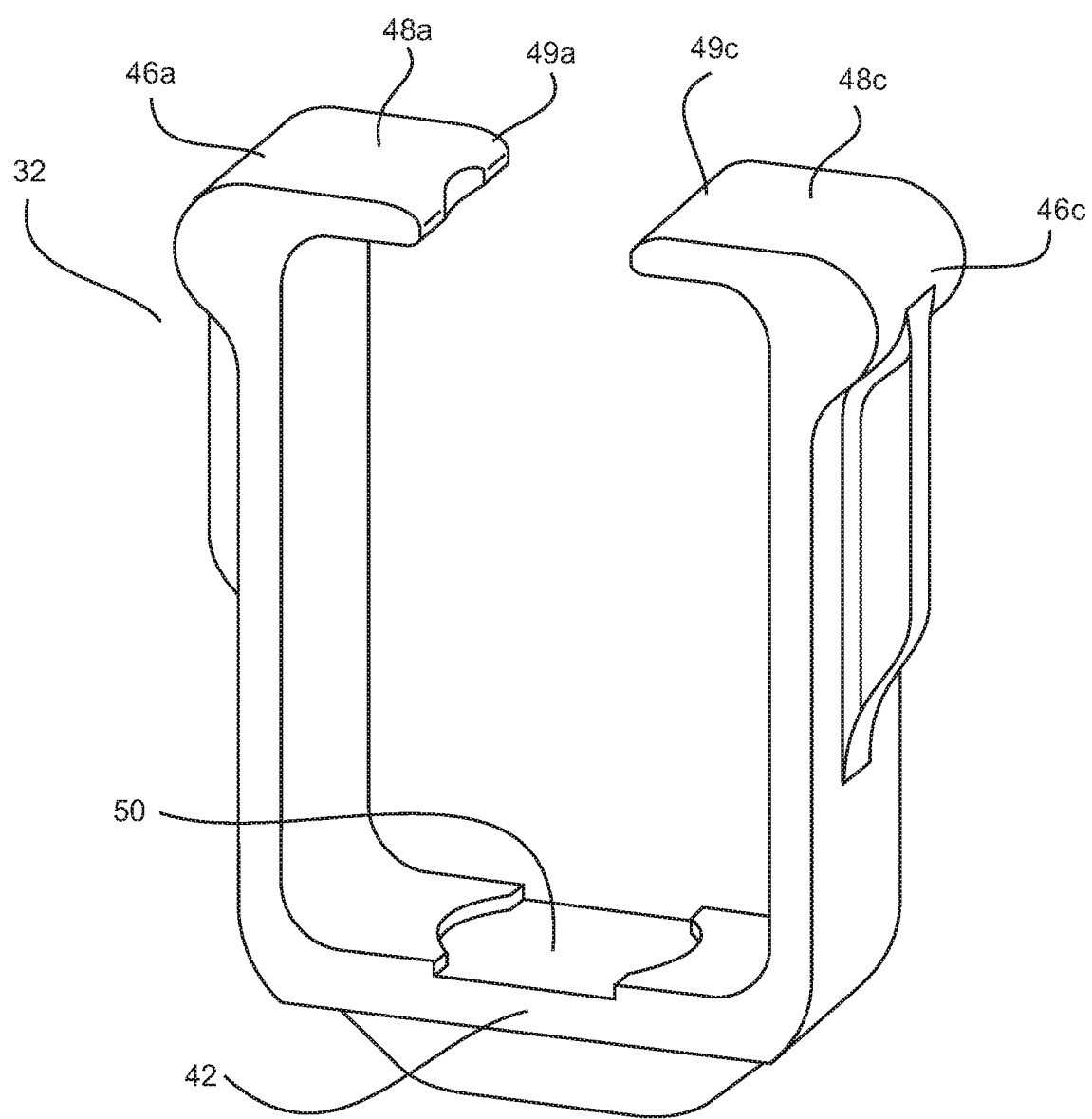
FIG. 4 is a perspective view of the frame member of the extraction apparatus shown in FIG. 3.

Referring now to FIGS. 3 and 4.

As shown in FIG. 3, the extraction apparatus 30 in accordance with the first embodiment of the invention comprises the frame member 32 and the actuator 34. The frame member 32 comprises a distal end 38 adapted for attachment to the ball joint 14 and a proximal end 40 providing a surface 42 for receiving the actuator 34.

In the particular arrangement shown in the FIGS. 3 and 4, the frame member 32 is configured so that the surface 42 is located opposite to the distal end 38 of the frame member 32 to position the actuator 34 opposite to the pivot joint 14; this arrangement permits that the force of the piston 66 be applied to the end 31 of the stud 28.

As shown in FIG. 4, the frame member 32 comprises a body having the surface 42 and arm members 44a and 44b extending perpendicularly from the surface 42. The arm members 44 comprise ends 46a and 46b defining the distal end 38 of the frame member 32—see FIG. 4.

As mentioned before, the distal end 38 is adapted to be attached to the pivot joint 14 as is shown in FIG. 3. For this, the ends 46 of the arm members 44 comprises fingers 48a and 48b that extend perpendicularly from the ends 46a and 46b towards each other. As can be appreciated in FIG. 3, the ends 49 of fingers 48 are adapted to be inserted into the spacing (as referred to as gap 15—see, for example, FIG. 3) defined between the upper side of the periphery of the socket 22 (in which the stud 28 is placed) and the lower side of the periphery of the socket 24 (in which the ball 26 is placed); in this manner; the frame member 32 is attached to the pivot joint 14.

Each end 49 of a finger comprises a reduced thickness with respect to the thickness of the remaining portion of the respective finger 48. As shown in, for example FIG. 4, the ends 49 comprise a curved end configured to define a reduced thickness of the end 49.

Furthermore, the frame member 32 comprises the surface 42 for receiving the actuator 34; in the particular arrangement shown in FIG. 4, the surface 42 comprises an indentation 50 for receiving the actuator 34.

Figure 6:
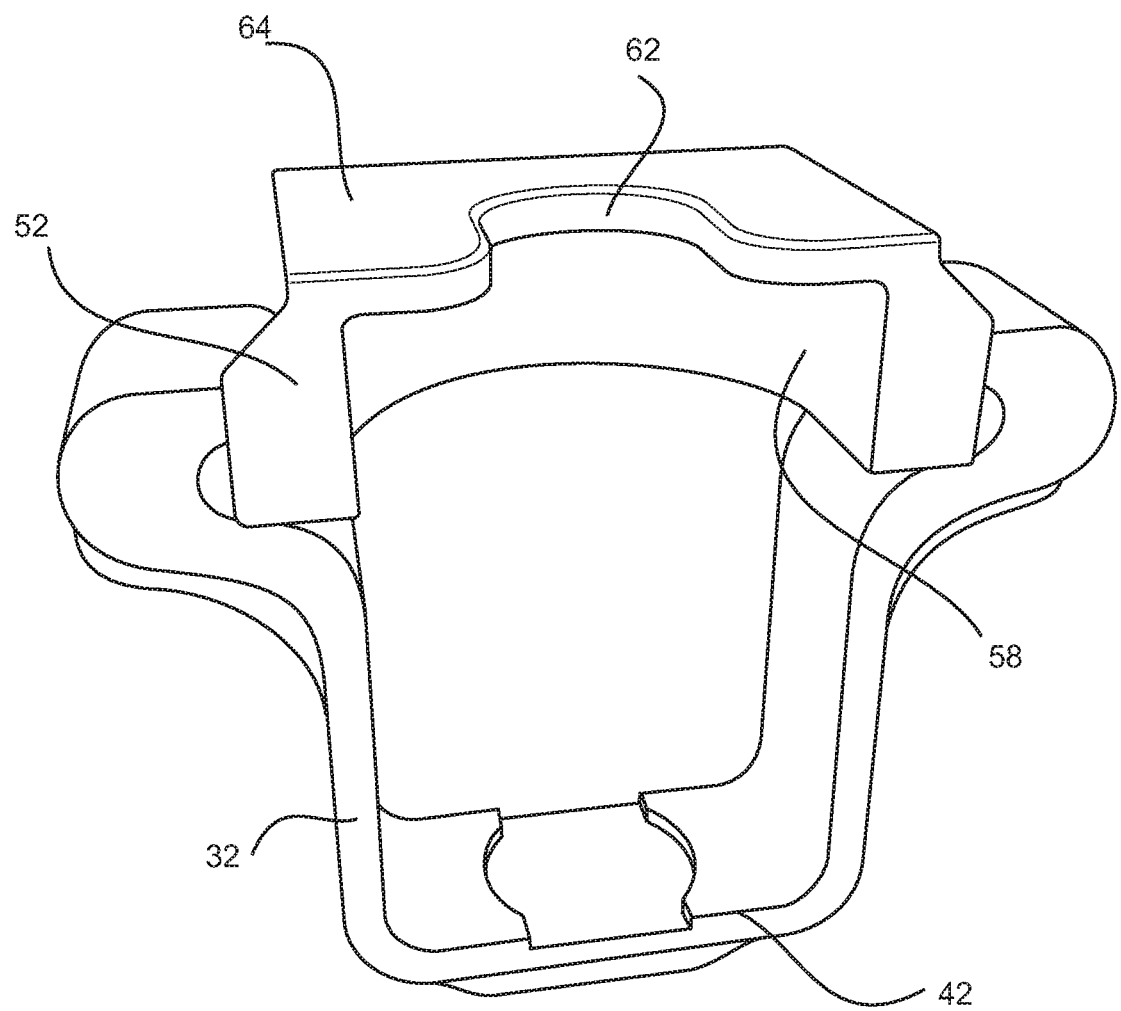
FIG. 6 is a perspective view of the frame member of the extraction apparatus shown in FIG. 5.

Referring now to FIGS. 5 and 6, FIGS. 5 and 6 show a particular arrangement of the extraction apparatus 30 in accordance with the second embodiment of the invention. The extraction apparatus 30 according to the second embodiment is similar to the apparatus according to the first embodiment and similar reference numerals are used to identify similar parts.

As shown in FIG. 5, the extraction apparatus 30 in accordance with the second embodiment of the invention comprises a frame member 32 having a proximal end 40 defining the surface 42 comprising the indentation 50 for receiving the actuator 34. Also, the frame member 32 shown in FIGS. 5 and 6 comprises the pair of arm members 44 extending perpendicularly from the surface 42.

Furthermore, the extraction apparatus 30 shown in FIGS. 5 and 6 is also adapted to be attached to the pivot joint 14. In particular, as is shown in FIG. 5 the frame member 32 comprises a distal end 38 being adapted to releasably receive a support member 52; for this, the arm members 44 have ends 46 comprising curved fingers 48a and 48b.

The curved fingers 48 define guides 54 for receiving flange members 56 of the support member 52. The flange members 54 extend outward from side walls of the support member 52 permitting attaching the frame member 32 to the pivot joint 14 when the support member 52 is mounted onto the socket 24 of the bell crank 36 as is shown in FIG. 5.

As mentioned above, the support member 52 is adapted to be mounted onto the socket 24 of the bell crank 36; for this, as shown in FIG. 6, the support member 52 comprises a cavity 58 for receiving the end portion 60 (see FIG. 5) of the socket 24 of the bell crank 36. The cavity 58 is covered by an upper surface 64.

Figure 1A:
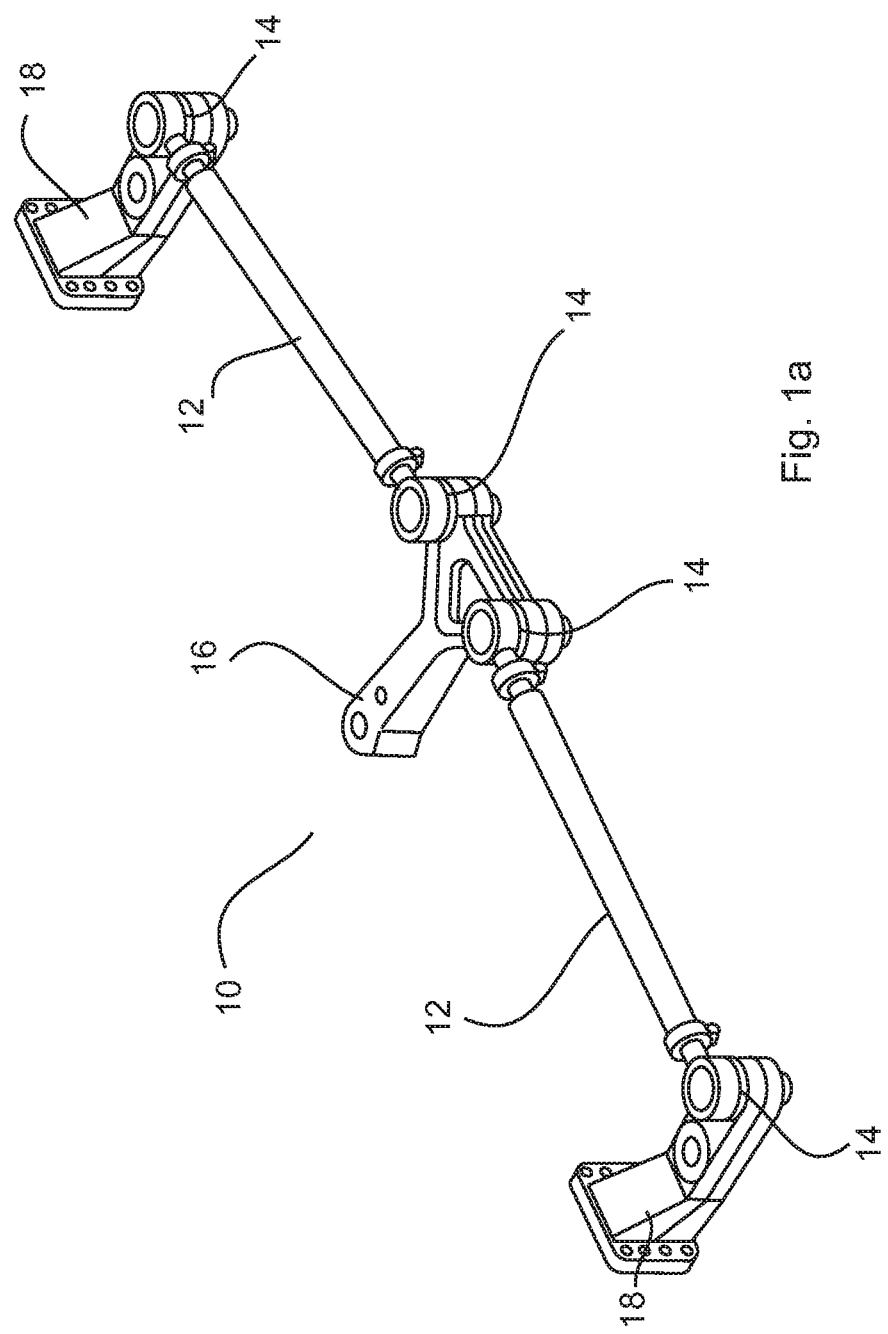
FIG. 1a is top perspective view of a portion of a vehicle steering system including the steering rods, bell crank and buckle arms.
Figure 1B:
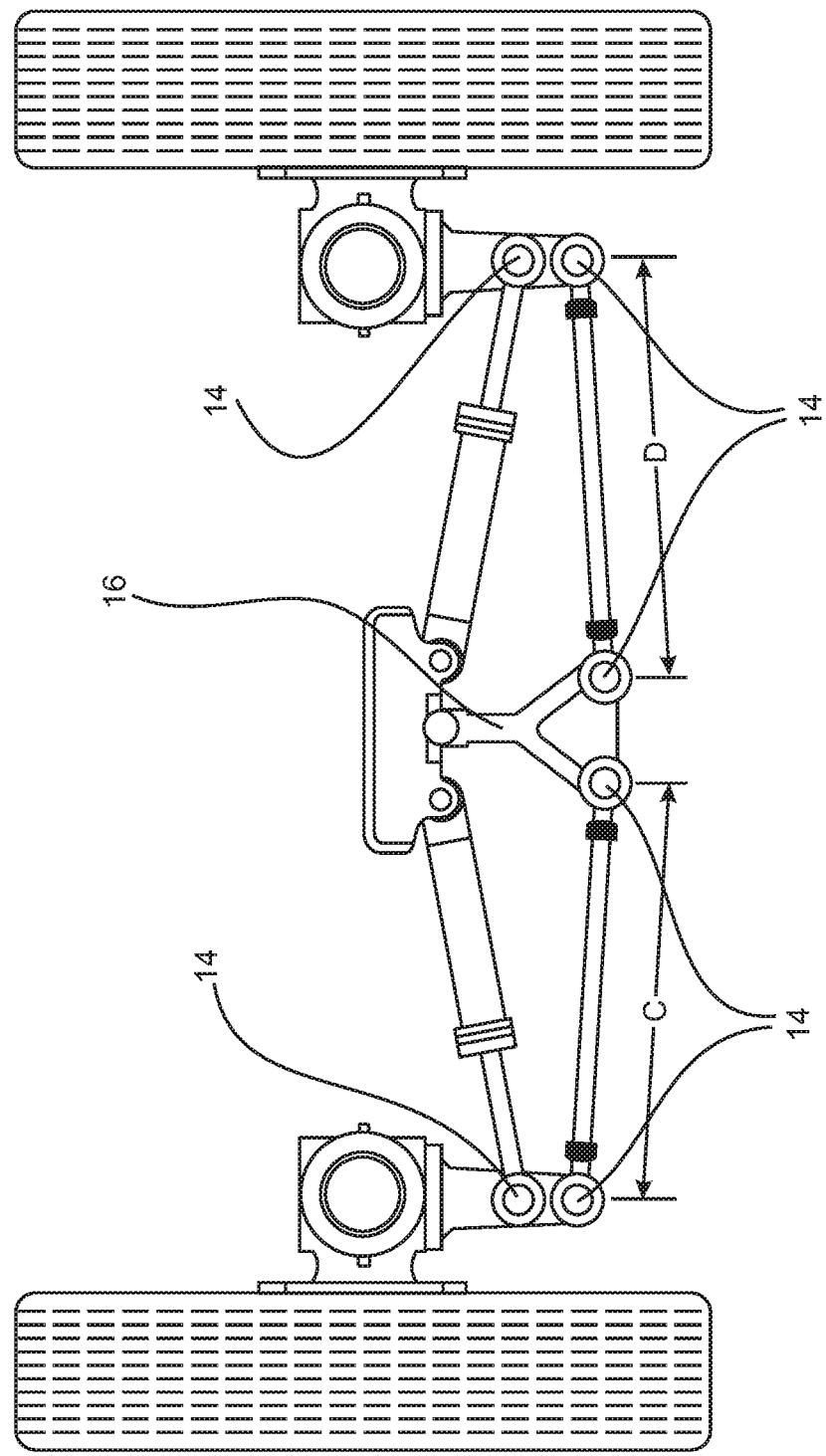
FIG. 1b is a top perspective of a vehicle steering system shown four pivot joints comprising each a steering stud.
Figure 2:
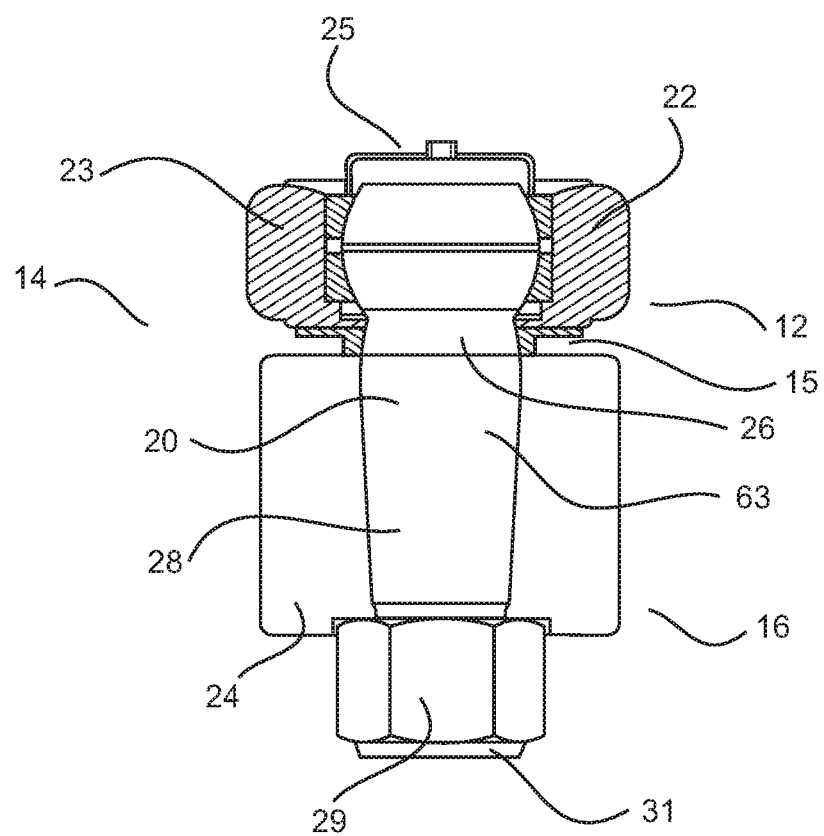
FIG. 2 is a cross-section of a pivot joint for joining together a steering rod to the bell crank.

The upper surface 64 comprises an indentation 62 for receiving the portion 63 (located between the ball 26 and the stud 28 as shown in FIG. 2) of the pin 20 when mounting the support member 52 onto the pivot joint 14 so that at least a portion of the surface 64 located between the sockets 22 and 24 when the support member 52 is attached to the pivot joint 14.

After attachment of the support member 52, the frame member 32 is slideably attached to the support member 52 in order to position the surface 42 (on which the actuator 34 is mounted) under the end 31 of the pin 20 for extraction of the stud 28 from the socket 24 defined by the socket 24 of the bell crank 16.

Figure 7:
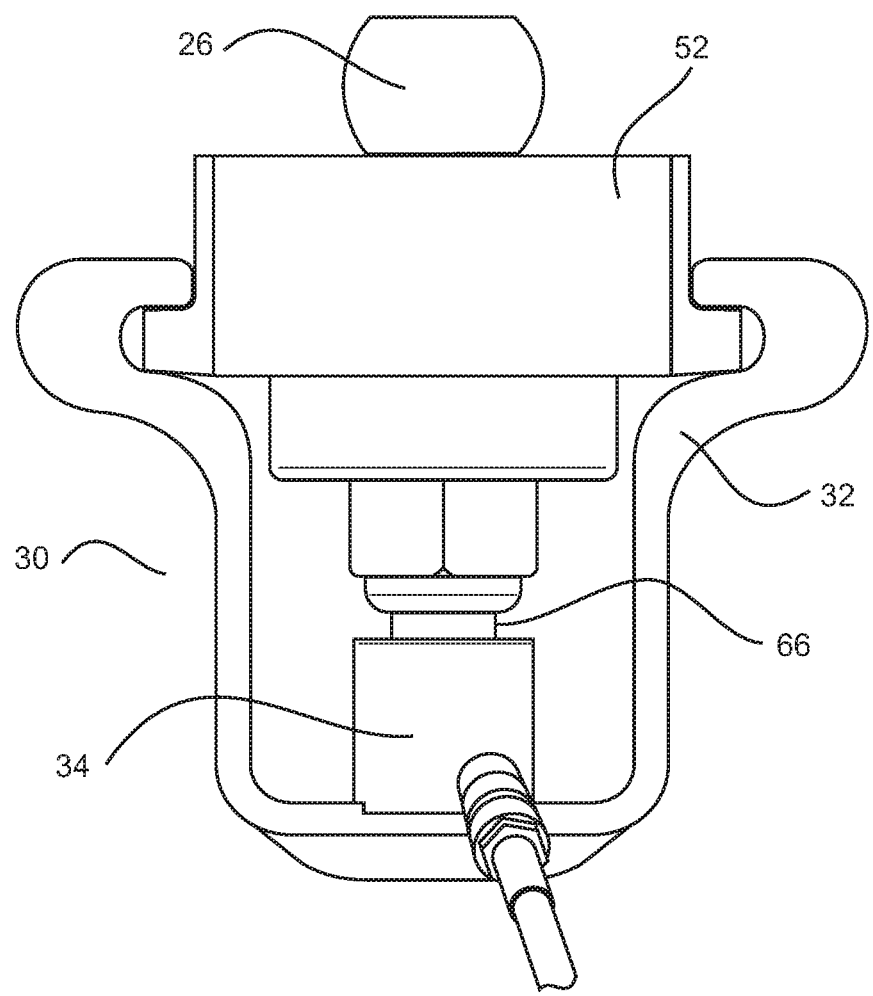
FIGS. 7 and 8 are perspective views of the pin extraction apparatus shown in FIG. 5 in operation.
Figure 8:
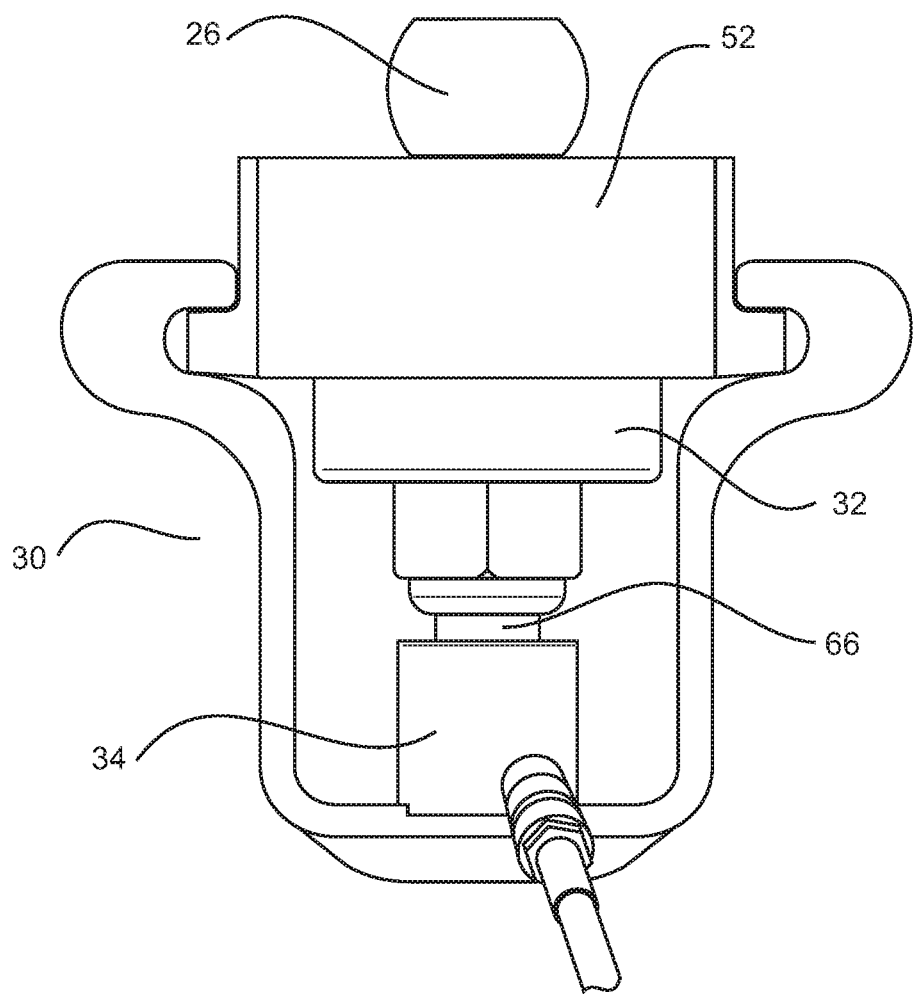

Referring now to FIGS. 7 and 8; FIGS. 7 and 8 show the process of operation for extraction of the stud 28 from the socket 24 define by the socket 24 of the bell crank 16 using the extraction apparatus 30 in accordance with the second embodiment of the invention. The process for extracting the stud 28 using the first embodiment of the invention is substantially identical than as depicted in FIGS. 7 and 8 using the second embodiment of the invention.

Referring now to FIGS. 9 to 14.

FIGS. 9 to 14 show a second arrangement of the extraction apparatus 30 in accordance with the first embodiment of the invention. This alternative arrangement of the extraction apparatus 30 according to the first embodiment is similar to the extraction apparatus 30 according to the first arrangement of extraction apparatus 30 shown in FIGS. 3 and 4, and similar reference numerals are used to identify similar parts.

Figure 9:
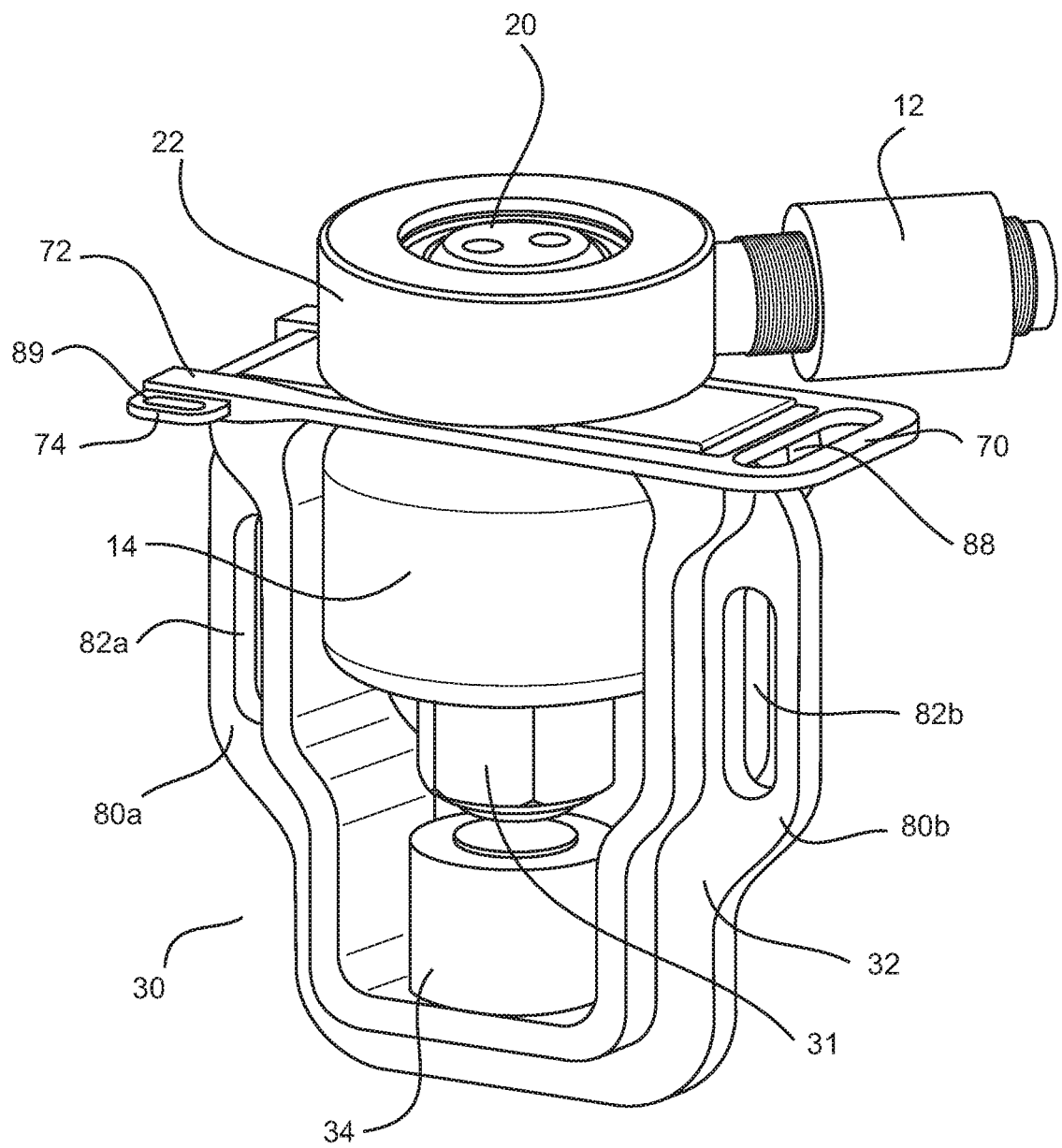
FIG. 9 is a perspective view of a second arrangement of an extraction apparatus in accordance with a first embodiment of the invention operatively connected to the pivot joint shown in FIG. 2.
Figure 10:
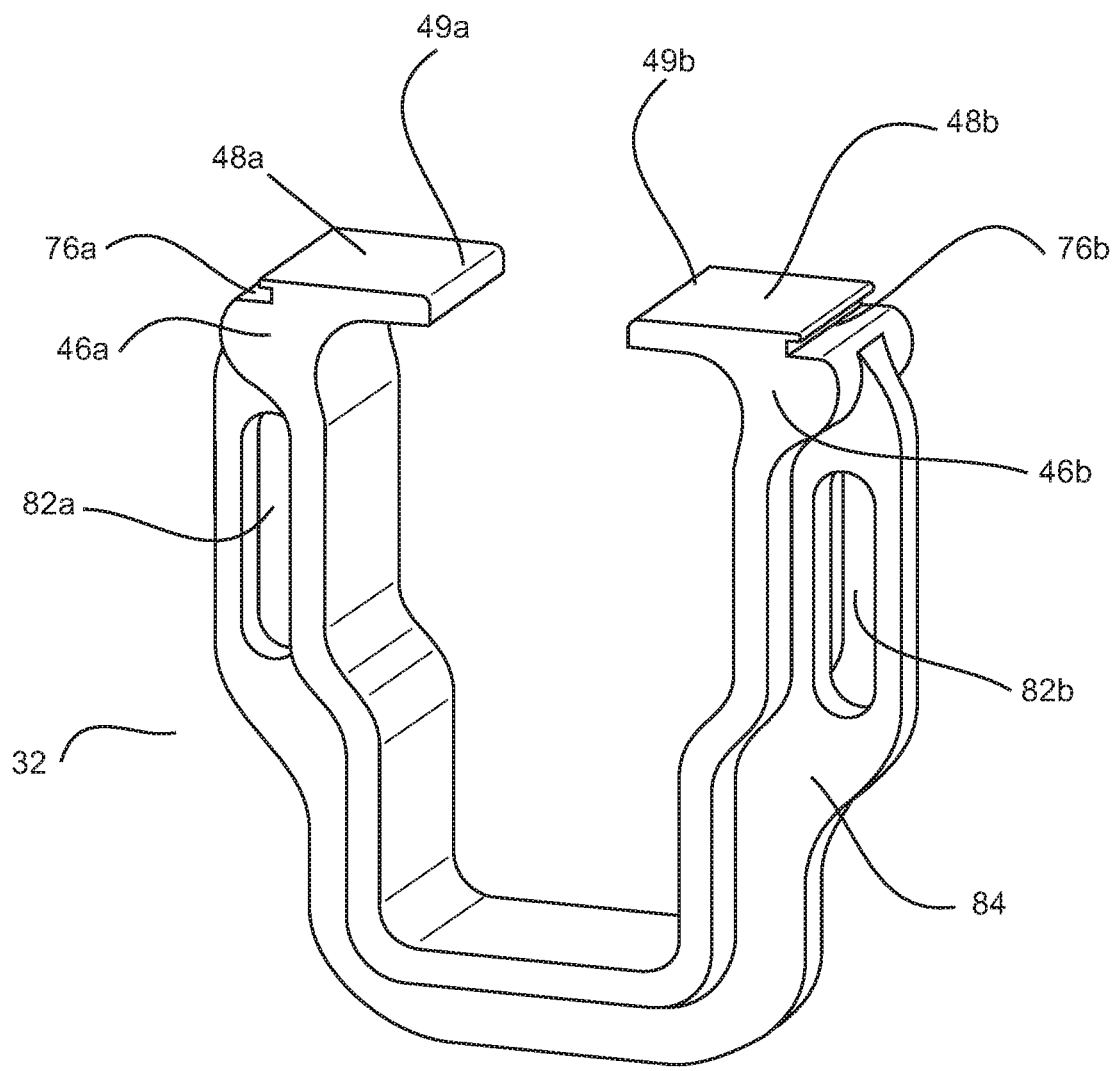
FIGS. 10 and 11 show, respectively, perspective and front views of the frame member of the extraction apparatus shown in FIG. 9.
Figure 11:
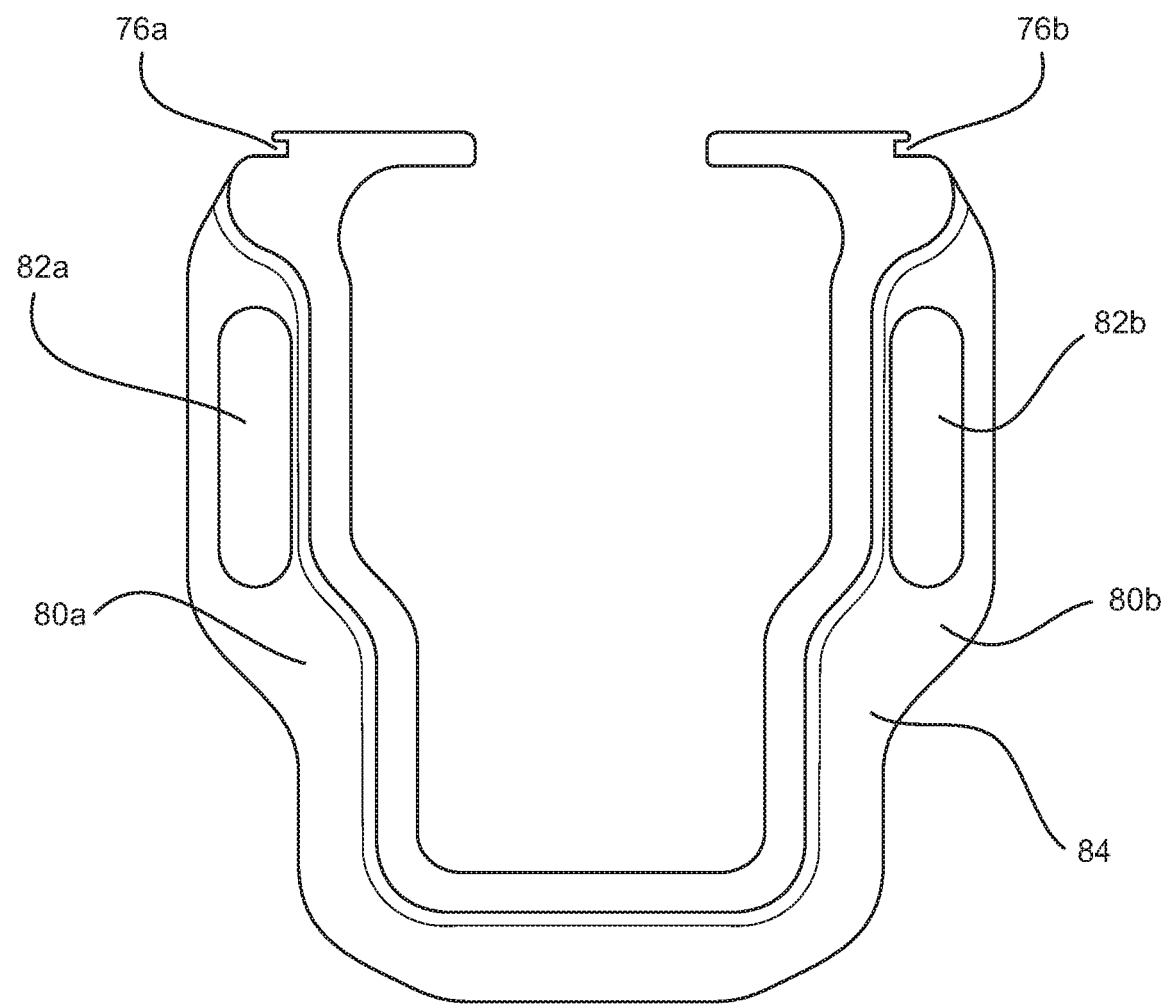

As shown in FIGS. 9 to 11, the extraction apparatus 30 in accordance with the second arrangement comprises a frame 32 having a proximal end 40 defining the surface 42 comprising the indentation 50 for receiving the actuator 34. Also, the frame member 32 shown in FIG. 9 comprises the pair of arm members 44 extending perpendicularly from the surface 42.

The extraction apparatus 30 shown in FIGS. 9 to 11 is also adapted to be attached to the pivot joint 14. In particular, as is shown in FIG. 10 the frame member 32 comprises a distal end 38 defined by ends 46 of the arm members 44 comprising the curved fingers 48a and 48b.

Further, the extraction apparatus 30 in accordance with the second arrangement of the first embodiment of the invention comprises retaining means 70 adapted to keep the frame member 32 of the extraction apparatus 30 attached to the pivot joint 14 during operation of the extraction apparatus 30. In particular, the retraining means 70 keep the finger ends 49 within the gap 15; keeping the finger ends 49 within the gap 15 is particularly advantageous during operation of the extraction apparatus 30 because during operation of the extraction apparatus 30 there exists the tendency of the distal end 38 of the frame member 32 to expand. Expansion of the distal end 38 draws the fingers 48 apart thus releasing the finger ends 49 from the gap 15 resulting in the extraction apparatus 30 being released from the pivot joint 14.

The retaining means 70 comprise a retainer 72 and a blade 74.

Figure 12:
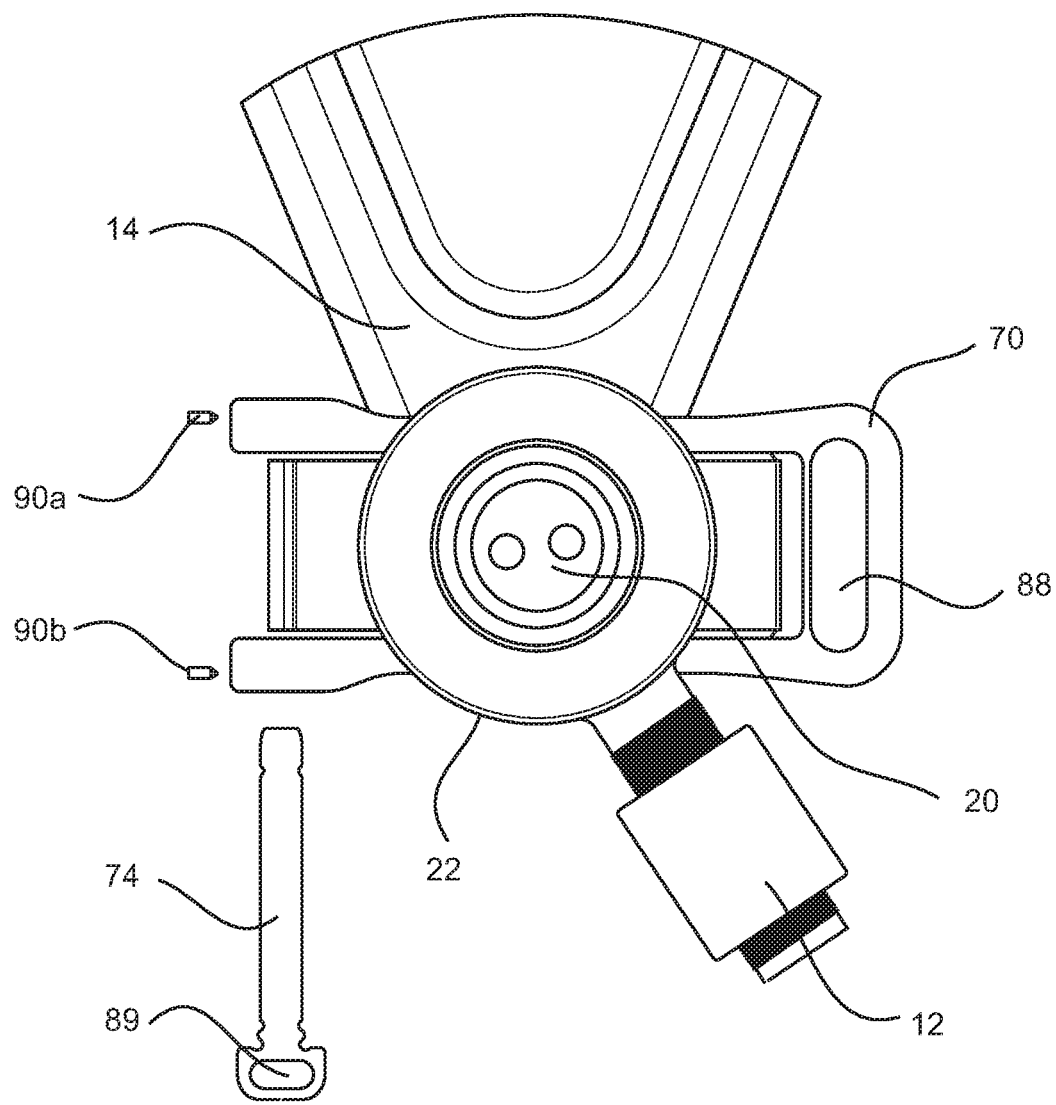
FIG. 12 is a top view of the extraction apparatus shown in FIG. 9 illustrating the retaining means prior assembly thereof.

The retainer 72 comprises a U-shaped body adapted for receiving the distal end 38 of the frame member 32 with the open end of the U-shaped body adapted to receive the blade 74 for closing the open end as shown in FIG. 12. In the particular arrangement shown in the FIGS. 9 to 12, the curved fingers 48a and 48b comprise at their curved portions first and second indentations 76a and 76b.

The first indentation 76a is adapted to receive the inner side of the closed end of the U-shaped body of the retainer 72 and the second indentation 76b is adapted to receive the inner side of the blade 74 when the retaining means 70 are installed to the frame member 32 as is shown in FIG. 9.

In a particular arrangement, the blade 74 may be fastened to the open end of the U-shaped body via fastening means such as screws 90 shown in FIG. 12.

Figure 15:
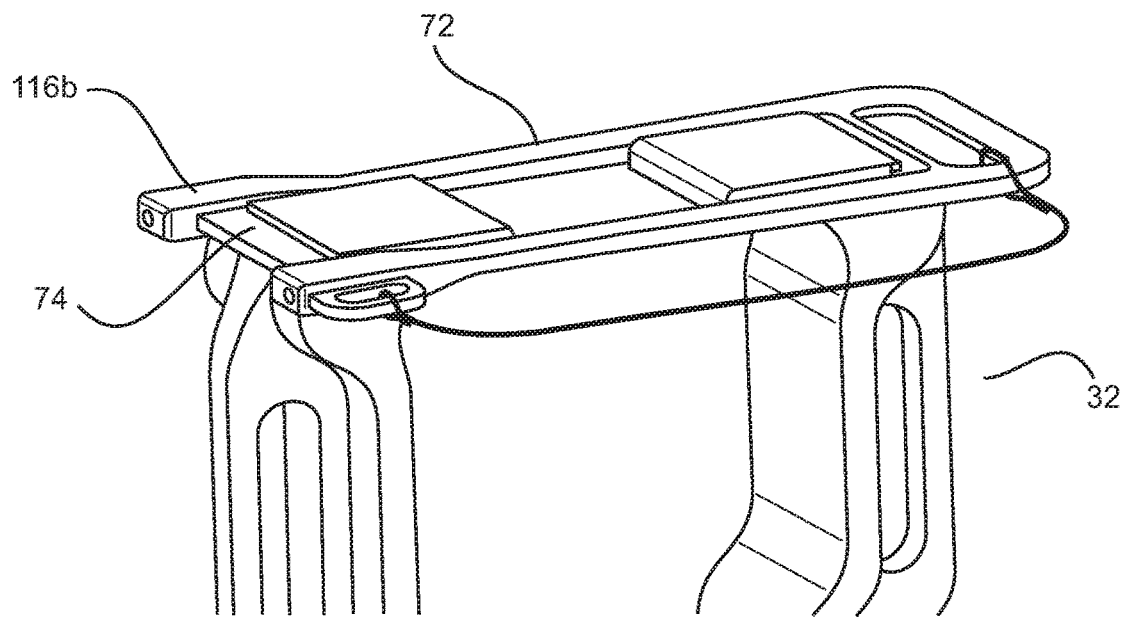
FIGS. 15 and 16 show a perspective view of a detail of the upper portion of the extraction apparatus shown in FIG. 9.
Figure 16:
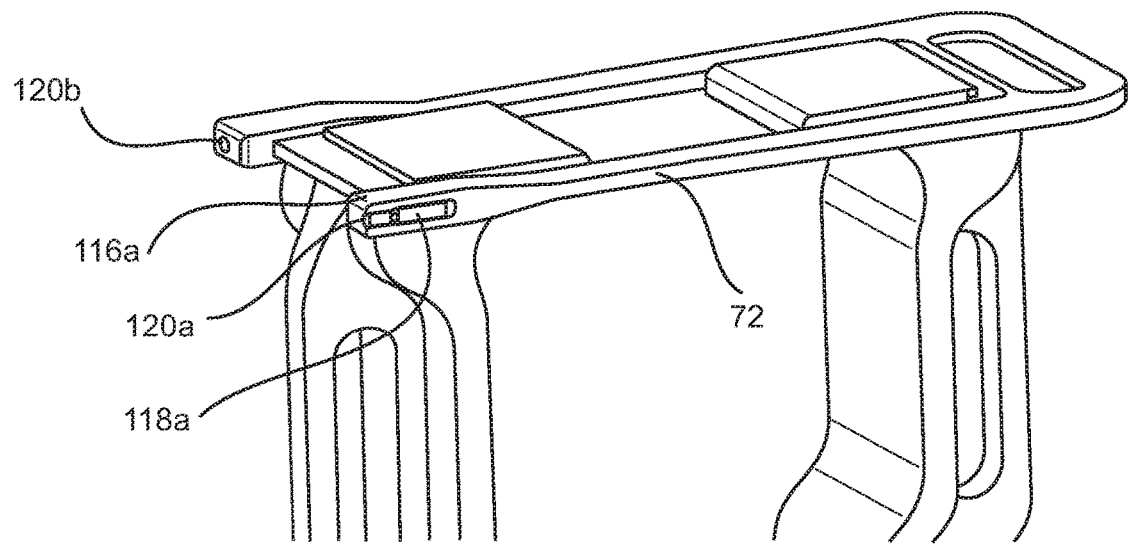
Figure 17:
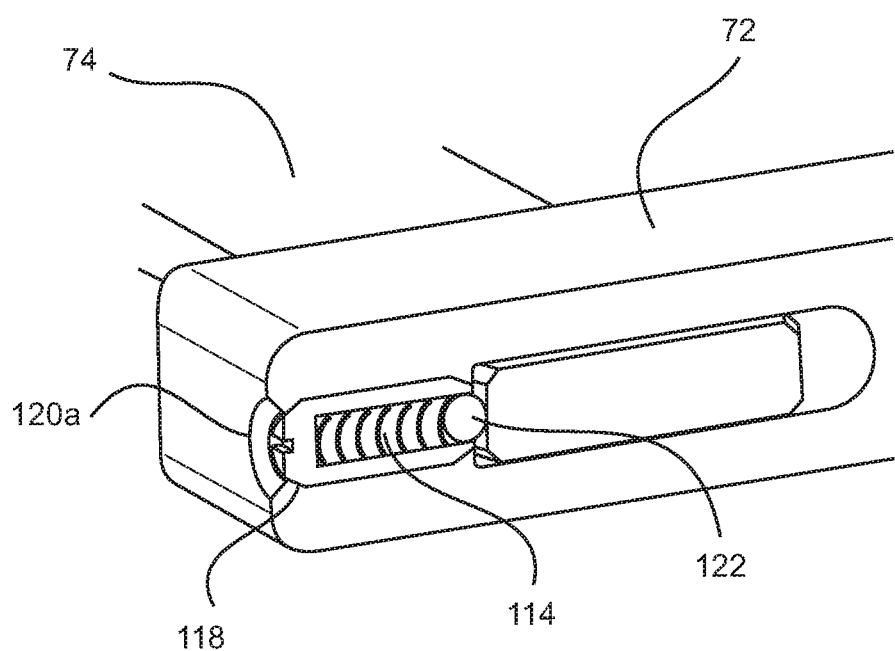
FIG. 17 show a perspective view of a detail of one end of the retaining means shown in FIGS. 12 to 14 illustrating the fastening means for fastening the retaining means to the extraction apparatus.

Alternatively, as shown in FIGS. 15 to 17, the fastening means may comprise spring loaded indent balls 114—see FIG. 17.

The fastening means also comprises means for receiving the spring loaded indent balls 114; in particular, each end 116 located at the open-end of the U-shaped retainer 72 comprises a passages 118 having an opening 120 for receiving the spring loaded indent balls 114 (or the screw 90). The passage 118 extends into the end 116 permitting the spring loaded indent balls 114 (or the screw 90) to traverse the passage such that the ball 122 rests on the ends of the blade 74 as can be appreciated in FIG. 17. This arrangement permits fastening the blade 74 to the retainer 72 during operation of the extraction apparatus 30.

The retaining means 70 are particularly advantageous during operation of the extraction apparatus 30 because when the retainer 72 is attached to the distal end 38 of the frame member 32 and the blade 74 closes the open end of the U-shaped body 72, the retaining means 70 impede the distal end 38 of the frame member 32 from falling off from the pivot joint 14 during actuation of the actuator 34 for breaking of the pivot joint 34 to remove the stud 20.

The extraction apparatus 30 may fall off from the pivot 14 while the actuator 34 applies pressure to the stud 28 forcing the distal end 38 of the frame member 32 to spread out and thus increasing the distance between the fingers 48 which can result in the finger ends 49 to be drawn out from the gap 15.

The presence of the retaining means 70, due to maintaining the fingers 48 at the same distance with respect to each other, impedes the extraction apparatus 30 from falling off.

Figure 13:
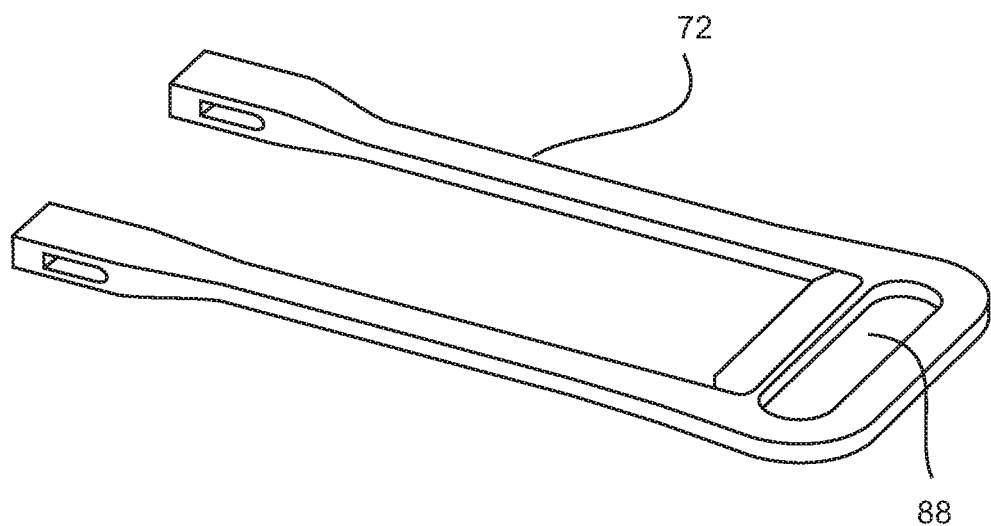
FIGS. 13 and 14 show, respectively, perspective views of the retainer and holder of the retaining assembly.
Figure 14:
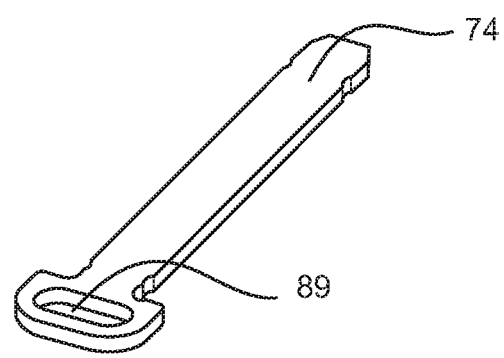

As shown in FIGS. 12 to 14, the retainer 70 comprises a handle 88 defined by an opening made at the closed end of the U-shaped body; and, the blade 74 comprises a handle 89 defined by an opening made at a proximal end of the blade 74.

Moreover, the second arrangement of the extraction apparatus 32 in accordance with the first embodiment of the invention comprises a flange 84 extending perpendicularly from the outer sides wall of the frame member 32, starting from the first end 46a of the arm member 44a to the second arm member 46b. The presence of the flange 32 reinforces the frame member 32.

Further, the flange 84 comprises handles 80a and 80b at each side of the frame member 32; in particular, each handle 80 is defined by an opening 82 traversing the flange 84 as is shown in FIGS. 10 and 11. In the arrangement of the extraction apparatus 32 shown in these figures, the openings 80 traverse the flange 84 such that the upper end each opening 80 is located adjacent the starting point 86 of the curvature of the curved fingers 48.

The handles 80 facilitate carrying and installation of the extraction apparatus 30.

In operation, the user presents the extraction apparatus 30 to the pivot joint 14 such that the surface 64 of the support member 52 (or the fingers 48 of the extraction apparatus 30 of the first embodiment of the invention) are located between the socket 22 of the rod 12 and the socket 24 of the bell crank 16. In this position the actuator 34 is located below the stud 28 such that the actuator 34 may apply its force to the lower end 31 of the pin 20 to extract the stud 28 from the socket 24 of the bell crank 16.

In the event that the second arrangement of the extraction apparatus 30 in accordance with the first embodiment of the invention is used, after attachment of the extraction apparatus 30 to the pivot joint 14, the retaining means 70 is engaged to the distal end 38 of the frame member 32 as shown in FIGS. 12 and 13. As mentioned before, the retaining means 70 impedes the extraction apparatus 30 from falling off the pivot joint 14 due impeding the arm member 46 of the frame member 32 to spread out during actuation od the actuator 34 for releasing the stud 28 from the socket 24.

As mentioned before, the actuator 34 comprises a piston 66 adapted to be selectively displaced between an extended and contracted condition to apply force to the end 31 of the stud 28. Once the extraction apparatus 30 is secured to the pivot joint; the actuator is operatively attached to a source of hydraulic oil as shown in FIGS. 7 and 8 so as to apply pressure (when delivery of the hydraulic oil) to the piston 66 so that it may apply a force to the end 31 of the stud 28 for removal thereof. Once the stud 28 has been released from the socket 24, delivery of the hydraulic oil is stopped. At this stage, the pivot joint 14 may be disassembled for repair.

Figure 18:
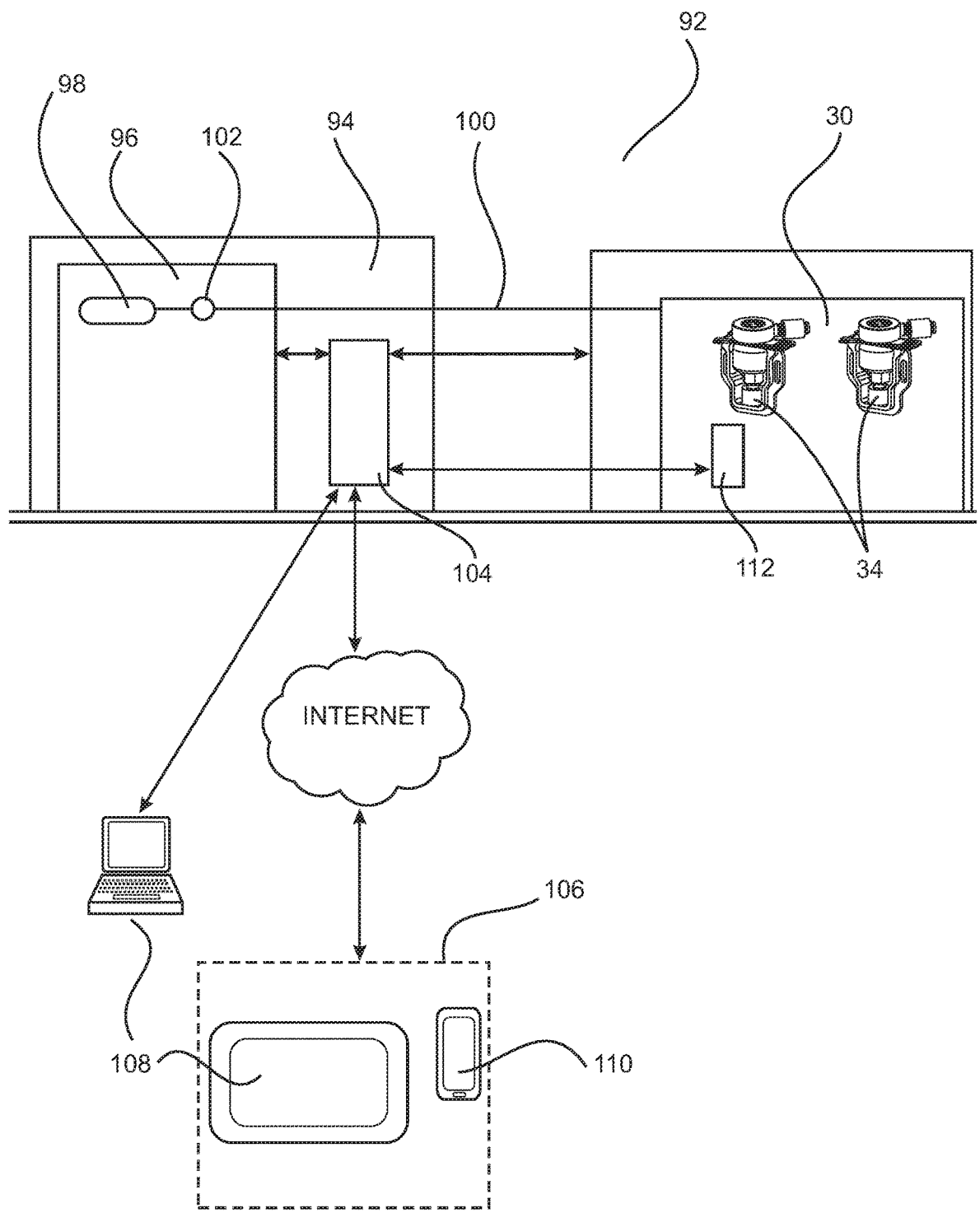
FIG. 18 is a schematic view of a system for removing a stud from within a body in accordance with an embodiment of the invention.

Furthermore, in accordance with another embodiment of the invention there is provided a system 10 and method for removing a stud 28 from a body such as a ball stud 28 from a socket 22 of the bell crank 16—see FIG. 18.

The system 92 comprises one or more extraction apparatus 30 as previously described and means 94 for operating the extraction apparatus 30 from a location spaced apart (a remote location) from the extraction apparatus 30. In a particular arrangement, the means 94 for operating the extraction apparatus 30 comprises at least (1) a hydraulic system 96 having a hydraulic fluid reservoir 98 fluidly connected to the actuator 34 via a hydraulic hose 100, (2) pump means 102 for delivering the hydraulic fluid to the actuator 34 and (3) control means 104 for operating the pump means 102.

Operating of the pump means 102 include (1) providing the hydraulic fluid to the actuator 34 to apply force to the stud 28 for removal from the socket 22 and (2) stopping the flow of the hydraulic fluid after removal of the stud 28 or if application of the force for removing the stud 28 needs to be stopped due to any unforeseen event occurring at the location of the particular extraction apparatus 30 that is being operated.

Further, the control system 104 are operatively connected to the hydraulic system 96 and the extraction apparatus 30 permitting control as well as monitoring of the stud removal process.

The control system 104 may comprise monitoring means 112 such as sensors and video cameras to permit monitoring of the extraction apparatus 30 during the stud removal process.

In a particular arrangement, the system 92 is configured to permit actuating the extraction apparatus 30 at a remote location outside the confided space including the steering components. In this particular arrangement, the hydraulic system is located at a remote location from the extraction apparatus 30 and operatively connected to the extraction apparatus via the hydraulic hose extending from the hydraulic fluid reservoir to the actuator 34. The control system 104 is adapted to interact (via wires or wireless through for example the internet or Bluetooth connection) with an interface 106 (such as computer hardware devices 108— such as laptops, tablets or PCs and/or mobile phones 110) to permit the operator to interact remotely with the system 92 for operating the extraction apparatus 30.

In accordance with this particular embodiment of the invention there is provided a method for removing at least one stud 28 from at least one socket 24 of at least one bell crank 16, the method comprises the steps of (1) mounting the extraction apparatus 30 onto the pivot joint 14 and operating the extraction apparatus 30 by actuating the hydraulic system to deliver the hydraulic fluid to the actuator 34 for removal of the stud 28 from the socket 22.

In particular, during the removal process an operator enters the confined space including the steering components and mounts the extraction apparatus 30 onto the pivot joint 14 for positioning the extraction apparatus 30 as is shown in FIG. 9; subsequently, the operator exits the confined space and proceeds to the remote location for operation of the hydraulic system 96; at the remote location, the operator activates the pump means 102 for delivering the hydraulic fluid to the actuator 34 for actuation thereof and removal of the stud 28; once the stud 28 is removed (or at least loosened) the operator may safely re-enter the confined space and proceed to remove the extraction apparatus 30 and service and/or repair the steering system 92.

It is evident the present embodiments are particularly advantageous due to the safety improvements they provide, being in particular, the lack of need for a heat source or impacts (hammer blows). Also, as described in the previous paragraphs, the system for extracting the stud 28 using the extraction apparatus 30 does not require the presence of the operator within the confined space at the location adjacent the pivot joint 14; thus, eliminating the safety risks inherent of the traditional methods for removing the studs 28.

As mentioned before, the traditional methods for removing the stud 28 from the socket 24 of the bell crank 16 usually requires heat to be applied to the bell crank 16 to expand the opening (taper) of the socket 24 along with hammer strokes to the bell crank 16 as well as the presence of the operator, while applying the impacts and the heat, within the confined space where the steering components are located.

Modifications and variations as would be apparent to a skilled addressee are deemed to be within the scope of the present invention.

Further, it should be appreciated that the scope of the invention is not limited to the scope of the embodiments disclosed.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A stud extraction apparatus configured to remove a stud from a pivot joint defined by a first socket of a bell crank and a second socket of a steering rod, the first and second sockets being arranged to define a gap therebetween, the stud extractor comprising a frame member, and an actuator attached to the frame member, the actuator being adapted to apply force to the stud, wherein the frame member comprises a body having an open end, a surface for receiving the actuator and opposing arm members extending from the surface defining a passage permitting the bell crank to traverse the frame member, the opposing arm members consisting of one pair of opposing arm members; wherein each arm member comprises a distal end comprising a finger having an end to be inserted between the gap defined by the first and second sockets as the bell crank traverses the frame member for fastening of the stud extractor to the bell crank; and wherein the surface for receiving the actuator is located in the passage opposite to the open end.

2. An apparatus according to claim 1 wherein the actuator comprises a hydraulic actuator.

3. An apparatus according to claim 1 wherein the actuator is operated from a location spaced apart from the apparatus for extracting a stud from a socket.

4. An apparatus according to claim 1 wherein the surface comprises an indentation for receiving the actuator.

5. An apparatus according to claim 1 wherein the frame member is configured so that the surface is located opposite to the distal end of the frame member to position the actuator opposite to the body for applying a force of the actuator to the stud for extraction thereof.

6. An apparatus according to claim 5 wherein the force is applied to an end of the stud.

7. An apparatus according to claim 1 wherein the end of the finger extends towards a finger of an opposing arm member from the end of each arm member.

8. An apparatus according to claim 1 wherein the end of the finger is configured to be inserted into the gap defined between sockets of the steering rod and the bell crank.

9. An apparatus according to claim 8 wherein each end of a finger comprises a reduced thickness with respect to the thickness of remaining portions of the respective finger.

10. An apparatus according to claim 1 wherein the frame member comprises at least one flange extending downward from side walls of the frame member.

11. A stud extraction apparatus configured to remove a stud from a pivot joint defined by a first socket of a bell crank and a second socket of a steering rod, the first and second sockets being arranged to define a gap therebetween, the stud extractor comprising a frame member, and an actuator attached to the frame member, the actuator being adapted to apply force to the stud, wherein the frame member comprises a body having a surface for receiving the actuator and opposing arm members extending from the surface defining a passage permitting the bell crank to traverse the frame member, the opposing arm members consisting of one pair of opposing arm members; wherein each arm member comprises a distal end comprising a finger having an end to be inserted between the gap defined by the first and second sockets as the bell crank traverses the frame member for fastening of the stud extractor to the bell crank;
  wherein the frame member comprises at least one flange extending downward from side walls of the frame member; and
  wherein the flange comprises openings for defining handles to facilitate carrying and installing the extraction apparatus to the pivot joint.

12. An apparatus according to claim 1 wherein the actuator comprises a hydraulic cylinder comprising a piston adapted to be selectively displaced between a contracted condition and an extended condition for applying the force to the stud for release of the stud from the pivot joint; wherein the force for releasing the stud from the pivot joint is applied to the stud as the piston moves from the contracted condition to the extended condition.

13. An apparatus according to claim 12 wherein the capacity of the hydraulic cylinder to be used as actuator depends on the particular use that will be given to the extraction apparatus.

14. An apparatus according to claim 1 wherein the extraction apparatus further comprises retaining means adapted to keep the frame member of the extraction apparatus attached to the pivot joint during operation of the extraction apparatus.

15. An apparatus according to claim 14 wherein the retaining means are adapted to impede expansion of the distal end of the frame member.

16. An apparatus according to claim 15 wherein the retaining means are adapted to impede the finger end from being drawn out from a gap defined between the socket and another socket for receiving a portion of the stud.

17. An apparatus according to claim 14 wherein the retaining means comprises a retainer and a blade adapted to be attached to the retainer.

18. An apparatus according to claim 17 wherein the retainer comprises an U-shaped body adapted for receiving the distal end of the frame member, with the open end of the U-shaped body adapted to receive the blade for closing the open end of the U-shaped body.

19. An apparatus according to claim 18 wherein the retaining means comprise fastening means for fastening the blade to the retainer.

20. An apparatus according to claim 19 wherein the fastening means comprise spring loaded indent balls (or screws) and passages traversing ends of the retainer that are located at the open-end of the U-shaped retainer.

21. An apparatus according to claim 20 wherein each passage comprises an opening for receiving the spring loaded indent ball (or the screw) and extending into the end permitting the spring loaded indent ball (or the screw) to traverse the passage such that the ball rests on the ends of the blade.

22. An apparatus according to claim 1 wherein each finger comprises a curved portion, the curved portion comprising first and second indentations.

23. An apparatus according to claim 22 wherein the first indentation is adapted to receive the inner side of the closed end of the U-shaped body of the retainer and the second indentation is adapted to receive the inner side of the blade when the retaining means are installed to the frame member.

24. An apparatus according to claim 18 wherein the retainer and the blade comprises each a handle defined by an opening made at each proximal end thereof.

25. A system for removing a stud from within a body, the system comprising at least one extraction apparatus according to claim 1 and means for operating the extraction apparatus from a location spaced apart from the extraction apparatus.

26. A system according to claim 25 wherein the means for operating the extraction apparatus from a location spaced apart from the extraction apparatus comprises a hydraulic system operatively connected to the extraction apparatus for permitting operation of the extraction apparatus.

27. A system according to claim 26 wherein the hydraulic system comprises a hydraulic fluid reservoir fluidly connected to the extraction apparatus via a hydraulic hose and pump means for delivering the hydraulic fluid to the actuator of the extraction apparatus.

28. A system according to claim 26 further comprising a control system operatively connected to the hydraulic system and the extraction apparatus permitting control as well as monitoring of the stud removal process.

29. A system according to claim 28 wherein the control system comprises monitoring means to permit monitoring of the extraction apparatus during the stud removal process.

30. A system according to claim 29 wherein the monitoring means comprise sensors and video cameras.

31. A system according to claim 28 wherein the control system is adapted to interact with an interface to permit the operator to interact remotely with the system for operating the extraction apparatus.

32. A system according to claim 31 wherein the interface comprises computer hardware devices and/or mobile phones.

* * * * *